(12) United States Patent
Mei et al.

(10) Patent No.: US 7,727,930 B2
(45) Date of Patent: Jun. 1, 2010

(54) CATALYST, MEMBRANE ELECTRODE ASSEMBLY AND FUEL CELL

(75) Inventors: Wu Mei, Yokohama (JP); Taishi Fukazawa, Fuchu (JP); Takahiro Sato, Kawasaki (JP); Itsuko Mizutani, Yokohama (JP); Tsuyoshi Kobayashi, Kawasaki (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 11/737,393

(22) Filed: Apr. 19, 2007

(65) Prior Publication Data

US 2007/0254806 A1    Nov. 1, 2007

(30) Foreign Application Priority Data

Apr. 28, 2006    (JP)    ............................. 2006-126854
Mar. 7, 2007     (JP)    ............................. 2007-057450

(51) Int. Cl.
B01J 23/38     (2006.01)
B01J 23/40     (2006.01)
B01J 23/42     (2006.01)
B01J 23/46     (2006.01)

(52) U.S. Cl. ...................... 502/326; 502/325; 502/327; 502/334; 502/339; 429/44

(58) Field of Classification Search ............... None
See application file for complete search history.

(56) References Cited

U.S. PATENT DOCUMENTS 3,506,494 A        4/1970   Adlhart
4,487,818 A *     12/1984   Ovshinsky et al. ............ 429/44
5,773,162 A *      6/1998   Surampudi et al. ............ 429/39
6,171,721 B1       1/2001   Narayanan et al.
2002/0132154 A1 *  9/2002   Adzic et al. ................... 429/40
2007/0087258 A1    4/2007   Mei et al.

FOREIGN PATENT DOCUMENTS

JP    2004-281177    10/2004
JP    2005-259557     9/2005

(Continued)

OTHER PUBLICATIONS

U.S. Appl. No. 12/049,770, filed Mar. 17, 2008, Yamamoto, et al.

(Continued)

*Primary Examiner*—Melvin C Mayes
*Assistant Examiner*—Colin W Slifka
(74) *Attorney, Agent, or Firm*—Oblon, Spivak, McClelland, Maier & Neustadt, L.L.P.

(57) ABSTRACT

A catalyst includes a conductive carrier and catalyst particles. The catalyst particles are supported on the conductive carrier and have a composition represented by formula 1, below. An area of a peak derived from a metal bond of a T-element is 15% or more of an area of a peak derived from an oxygen bond of the T-element in a spectrum obtained by X-ray photoelectron spectroscopic method.

$$Pt_xRu_yT_z \quad (1)$$

where the T-element is at least one element selected from the group consisting of V, Nb and Hf, x is 30 to 60 at. %, y is 20 to 50 at. % and z is 5 to 50 at. %.

19 Claims, 1 Drawing Sheet

FOREIGN PATENT DOCUMENTS

| | | |
|---|---|---|
| JP | 2005-532670 | 10/2005 |
| JP | 2005-334685 | 12/2005 |
| WO | WO 2005/088748 A1 | 9/2005 |

OTHER PUBLICATIONS

U.S. Appl. No. 12/050,497, filed Mar. 18, 2008, Mizutani, et al.

S. R. Narayanan, et al., "IV.J.4 Advanced Catalysts for Direct Methanol Fuel Cells", DOE Hydrogen Program FY 2004 Progress Report, 2005, pp. 610-615.

U.S. Appl. No. 12/121,282, filed May 15, 2008, Fukazawa, et al.
U.S. Appl. No. 12/201,332, filed Aug. 29, 2008, Tamura, et al.
U.S. Appl. No. 11/863,798, filed Sep. 28, 2007, Mei, et al.
U.S. Appl. No. 11/863,856, filed Sep. 28, 2007, Mei, et al.

\* cited by examiner

CATALYST, MEMBRANE ELECTRODE ASSEMBLY AND FUEL CELL

CROSS-REFERENCE TO RELATED APPLICATIONS

This application is based upon and claims the benefit of priority from prior Japanese Patent Applications No. 2006-126854, filed Apr. 28, 2006; and No. 2007-057450, filed Mar. 7, 2007, the entire contents of both of which are incorporated herein by reference.

BACKGROUND OF THE INVENTION

1. Field of the Invention

The present invention relates to a catalyst, a membrane electrode assembly and a fuel cell provided with the catalyst and a method of manufacturing the catalyst.

2. Description of the Related Art

Polymer electrolyte fuel cells and particularly, polymer electrolyte fuel cells using a methanol aqueous solution as a fuel can work at low temperatures and also be made small and light. Studies have therefore been pursued in recent years concerning using these cells as power sources for mobile devices. However, the performances of fuel cells is still not enough for commercialization. Fuel cells convert chemical energy into electrical energy by the catalytic reaction of the electrode. A highly active catalyst is essential to develop a high performance fuel cell.

As the anode catalyst of a fuel cell, PtRu is usually used. The voltage loss of the PtRu catalyst is about 0.3 V which accounts for about 25% of the voltage 1.21 V theoretically allowed to be generated. Therefore, there is a demand for an anode catalyst having an activity such as methanol oxidation activity exceeding that of PtRu. In order to enhance methanol oxidation activity, various studies including adding other elements to PtRu have been made and reported.

For example, the publication of U.S. Pat. No. 3,506,494 refers to the effect obtained by adding 10 types of metals such as tungsten, tantalum and niobium to PtRu. It should be noted that catalytic activity depends on synthetic process significantly even if the catalyst has the same composition, because the catalytic reaction occurs on the surface of each of nano-size catalyst particles, and several atomic layers in the surface of the catalyst particle largely affect catalytic activity. For instance, JP-A 2005-259557 (KOKAI) relates to a method of manufacturing an anode catalyst by adding the IV to VI group metal to Pt and Ru by a dipping method. JP-A 2005-259557 (KOKAI) reports that the methanol activity is largely varied by the dipping sequence of the adding metals, Pt and Ru. As to the ratio of Pt, Ru to the IV to VI group metals, it is only described that Pt:Ru:Metals to be added=317.7:82.3:100.

It is considered that there is still a large possibility to develop catalyst having high activity over PtRu by controlling the synthetic process to synthesize catalyst particles having a nano-structure which has never existed. Solution reaction methods such as a dipping method have been generally used in catalyst synthesis so far. However, it is difficult for solution reaction methods to control the structure and surface of catalyst particles made of elements which are unlikely to be reduced or alloyed.

It is advantageous to each of a sputtering method and a deposition method in view of synthesizing the catalyst particles made of elements which are unlikely to be reduced or alloyed. However, much study has not yet been made concerning the effects of the type of elements, composition of the catalyst particles, substrate material, substrate temperature and the like on the sputtering method and deposition method.

When catalyst particles are nanoparticles, the state of electrons on the surface of the catalyst particles and the nano-structure of the catalyst particles tend to be largely dependent on the type and amount of elements to be added to the catalyst particles. It is considered that in order to obtain catalyst particles having high activity and high stability, it is necessary to make appropriate the type of elements to be added to the catalyst particles, the amount of elements to be added and the combination of elements.

JP-A 2004-281177 (KOKAI) reports the effect of Sn and W added to a Pt—Ru alloy when a catalyst is formed on a substrate made of a gold foil or Si by a sputtering method. However, it cannot be said that a catalyst having sufficient methanol oxidation activity is established. There is no description as to the effect of the addition of elements other than Sn and W in JP-A 2004-281177 (KOKAI). As to the effect obtained when Sn is added, the effect obtained when the amount of Sn in a catalyst layer is 25% is reported.

PCT National Publication No. 2005-532670 discloses a catalyst useful for the electrolytic oxidation of a fuel in a fuel cell using a proton exchange membrane. The catalyst is prepared by chemically activating substantially semicrystalline $PtX_aAl_b$ deposited on a base material. In the above composition formula, an element selected from the group consisting of Ru, Rh, Me, W, V, Hf, Zr, Nb and Co is used as X on the condition that when "a" is 1 and b is 8, X is selected from W, V, Hf, Zr, Nb and Co. "a" is 0.001 at the least and b is 0.85(1+a) at the least.

JP-A 2005-334685 (KOKAI) describes that second microparticles with first microparticles stuck to a surface thereof are used as catalyst particles. In this case, a thin film is formed on the surface of the first microparticles by sputtering.

The publication of U.S. Pat. No. 6,171,721B1 discloses that a catalyst is formed on the surface of an electrolyte membrane by sputter-depositing.

JP-A 2004-281177 (KOKAI) discloses that an alloy made from at least one element selected from tungsten, tin, molybdenum, copper, gold, manganese and vanadium, platinum and ruthenium is used as a methanol oxidation electrode catalyst.

In the meantime, a catalyst having a composition Pt—Ru—Ni—Zr is disclosed in S. R. Narayanan, Jay Whitacre DOE Hydrogen Program FY2004, Progress Report p 610.

As shown by the above documents, it has been proposed to use a sputtering process and to use many elements other than Pt and Ru for the preparation of a catalyst. However, investigation on catalyst compositions is not enough and it cannot be said that catalysts having sufficient methanol oxidation activity have been established.

BRIEF SUMMARY OF THE INVENTION

According to a first aspect of the present invention, there is provided a catalyst comprising:

a conductive carrier; and catalyst particles which are supported on the conductive carrier and have a composition represented by formula 1, below, and in which an area of a peak derived from a metal bond of a T-element is 15% or more of an area of a peak derived from an oxygen bond of the T-element in a spectrum obtained by X-ray photoelectron spectroscopic method:

$$Pt_xRu_yT_z \qquad (1)$$

where the T-element is at least one element selected from the group consisting of V, Nb and Hf, x is 30 to 60 at. %, y is 20 to 50 at. % and z is 5 to 50 at. %.

According to a second aspect of the present invention, there is provided a catalyst comprising:

a conductive carrier; and catalyst particles which are supported on the conductive carrier and have a composition represented by formula 2, below, and in which an area of a peak derived from a metal bond of a M-element is 15% or more of an area of a peak derived from an oxygen bond of the M-element in a spectrum obtained by X-ray photoelectron spectroscopic method (XPS):

$$Pt_xRu_yM_zSn_uA_t \quad (2)$$

where the M-element is at least one element selected from the group consisting of V, Nb, Hf and W, the A element is at least one element selected from the group consisting of Rh, Os, Ir, Mo, Ti and Ni, x is 30 to 60 at. %, y is 20 to 50 at. %, z is 5 to 50 at. %, u is 0.5 to 12 at. % and t is 25 at. % or less (including 0 at. %).

According to a third aspect of the present invention, there is provided a catalyst having a composition represented by the following formula (3) and satisfying the following equations (4) and (5) in X-ray photoelectron spectrometry (XPS):

$$Pt_xRu_yT1_aX1_b \quad (3)$$

where a T1 element is at least one element selected from the group consisting of V, W and Mo, an X1 element is at least one element selected from the group consisting of Nb, Cr, Zr and Ti, x is 20 to 70 at. %, y is 10 to 50 at. %, "a" is 1 to 30 at. % and b is 0.5 to 20 at. %;

$$0 \leq (C_{oxygenT1}/C_{metalT1}) \leq 4 \quad (4)$$

$$0 \leq (C_{metalX1}/C_{oxygenX1}) \leq 2 \quad (5)$$

where $C_{oxygenT1}$ is an amount of the T1 element having an oxygen bond which is obtained by the XPS spectrum, $C_{metalT1}$ is an amount of the T1 element having a metal bond which is obtained by the XPS spectrum, $C_{metalX1}$ is an amount of the X1 element having a metal bond which is obtained by the XPS spectrum, and $C_{oxygenX1}$ is an amount of the X1 element having an oxygen bond which is obtained by the XPS spectrum.

According to a fourth aspect of the present invention, there is provided a catalyst having a composition represented by the following formula (6) and satisfying the following equations (4) and (7) in X-ray photoelectron spectrometry (XPS):

$$Pt_xRu_yT1_aX2_cA1_d \quad (6)$$

where a T1 element is at least one element selected from the group consisting of V, W and Mo, an X2 element is at least one element selected from the group consisting of Nb, Cr, Zr, Ta and Ti, an A1 element is at least one element selected from the group consisting of Sn, Hf, Ni, Rh, Os and Ir, x is 20 to 70 at. %, y is 10 to 50 at. %, "a" is 1 to 30 at. %, c is 0.5 to 20 at. %, and d is 0.5 to 30 at. %;

$$0 \leq (C_{oxygenT1}/C_{metalT1}) \leq 4 \quad (4)$$

$$0 \leq (C_{metalX2}/C_{oxygenX2}) \leq 2 \quad (7)$$

where $C_{oxygenT1}$ is an amount of the T1 element having an oxygen bond which is obtained by the XPS spectrum, $C_{metalT1}$ is an amount of the T1 element having a metal bond which is obtained by the XPS spectrum, $C_{metalX2}$ is an amount of the X2 element having a metal bond which is obtained by the XPS spectrum, and $C_{oxygenX2}$ is an amount of the X2 element having an oxygen bond which is obtained by the XPS spectrum.

DETAILED DESCRIPTION OF THE INVENTION

Figure 1:
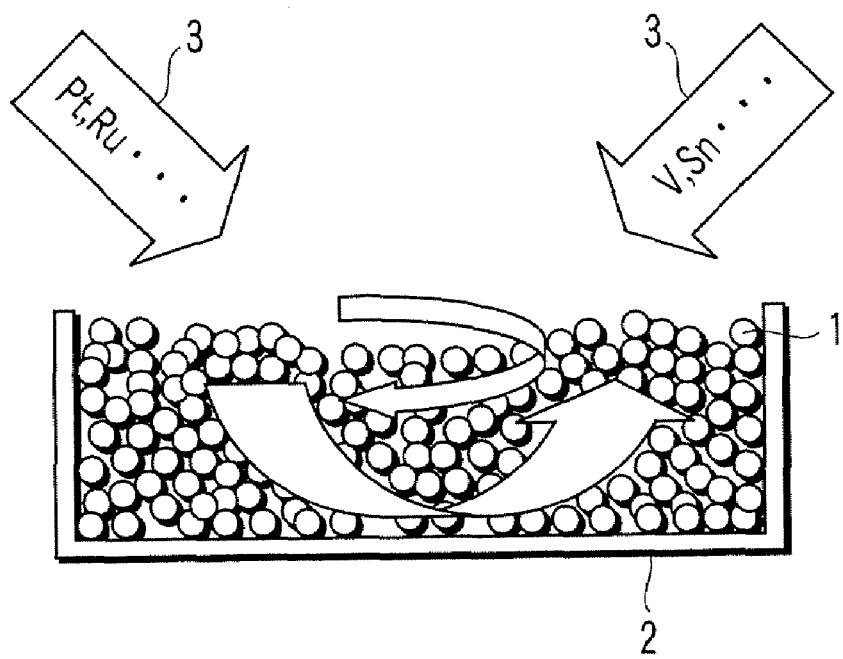
FIG. 1 is a schematic for explaining a method of manufacturing a catalyst according to an embodiment.

The inventors of the present invention have made earnest studies as to the relationship between catalyst synthetic process and catalyst composition to obtain a highly active catalyst. As a result, the inventors have found that if catalyst particles represented by formula 1 or 2, below, are formed on a conductive carrier kept at 400° C. or less by a sputtering method or a deposition method when a T-element or M-element is contained in a PtRu alloy, these elements can be bound with other elements such as Pt and Ru by a metal bond. This finding has led to a success in realizing a highly active catalyst. The catalyst is one suitable to a polymer electrolyte fuel cell.

$$Pt_xRu_yT_z \quad (1)$$

where the T-element is at least one element selected from the group consisting of V, Nb and Hf, x is 30 to 60 at. %, y is 20 to 50 at. % and z is 5 to 50 at. %.

$$Pt_xRu_yM_zSn_uA_t \quad (2)$$

where the M-element is at least one element selected from the group consisting of V, Nb, Hf and W, the A element is at least one element selected from the group consisting of Rh, Os, Ir, Mo, Ti and Ni, x is 30 to 60 at. %, y is 20 to 50 at. %, z is 5 to 50 at. %, u is 0.5 to 12 at. % and t is 25 at. % or less (including 0 at. %).

An embodiment of the present invention will be explained.

First, explanations will be furnished as to the catalyst.

Pt and Ru are major catalyst elements. Pt is significantly effective on oxidation of hydrogen and a dehydrogenation reaction of organic fuels and Ru is very effective to restrain CO poisoning. When the amount of Ru is small, insufficient activity arises. Therefore, it is desirable that x be 30 to 60 at. % and y be 20 to 50 at. %. Also, there is the case where the activity of the catalyst is improved by substituting a part of PtRu with other metals. Because noble metals are particularly superior in chemical stability, Rh, Os, Ir and the like are desirable.

T is a promoter. The inventors of the present invention have found that high activity is obtained by adding one or more types selected from V, Nb and Hf to Pt and Ru. Although the mechanism providing high activity is not clarified, the main reason why such high activity is obtained is considered to be due to the surface structure and electronic condition of the catalyst having the specific mixing state of each element. Particularly, the existence of a metal bond between the T-element and Pt/Ru is considered to be important. If the catalyst particles are synthesized by a solution reaction method, reducing reactions of V, Nb, Hf and the like are scarcely caused. As a result, the formation of an alloy of the T-element and Pt/Ru are unlikely to proceed and therefore, a large part of the obtained catalyst particles are a mixture of the PtRu microparticles and microparticles of an oxide of the T-element. When the catalyst particles synthesized by a solution reaction method is subjected to surface analysis using X-ray photoelectron spectrometry (XPS), most of the T-element is bound with other elements by an oxygen bond. On the other hand, in the catalyst of the embodiment, T-element which is bonded to other elements via metal bond exists. The area of the peak derived from the metal bond of the T-element is 15% or more of the area of the peak derived from the oxygen bond of the T-element in an XPS spectrum (including 100%). Because XPS measurement can only detect photoelectrons (signals) existing to a depth of about several nm from the surface of a sample, it is therefore considered that the T-element put into a metallic state exists within a region to a depth of several nm from the surface of the catalyst particles of the embodiment. Moreover, because nano-particles made of a T-element cannot exist stably in the atmosphere, it is considered that alloy particles made of the T-element, Pt and Ru exist in the catalyst of the embodiment. In the case where an oxidation layer is formed on the surface of the catalyst microparticles, the possibility is large that the area of the peak (signals) derived from the oxygen bond of the T-element is higher than the area of the peak derived from the metal bond of the T-element in an XPS spectrum, because the intensity of signals existing in the portion close to the surface occupies an extremely large part of the intensity of all signals detected by XPS measurement. The existence of the metal bond of the T-element in the catalyst of the embodiment can also be confirmed by extended X-ray absorption fine structure measurement (EXAFS). Because X rays transmit the whole catalyst in the EXAFS measurement, the bond information of the whole catalyst can be read in the EXAFS method similarly to the XRD method (X ray diffraction analysis). A peak derived from a metal bond of the T-element which has a bond distance of 2 to 3 Å was found in the radial distribution of each T-element measured by EXAFS. In the catalyst particles synthesized by a solution reaction method, a peak derived from the oxygen bond of the T-element which has a bond distance of less than 2 Å prevailed so that a peak derived from a metal bond was scarcely found. The XRD spectrum of the catalyst particles used in the embodiment was analyzed by XRD (X ray diffraction analysis) spectrum and as a result, the position of the main peak is different from that of the case of a PtRu alloy. It is estimated that the alloy structure was changed by the addition of the T-element. In this case, the interplanar spacing at the main peak of the catalyst particles used in the embodiment is 2.16 to 2.25 Å. The composition and production process of the catalyst are important to obtain the specific mixing state of Pt, Ru and the T-element which provides high activity.

The amount z of the T-element in the catalyst particles is preferably 5 to 50 at. %. When the amount z of the T-element is less than 5 at. %, it is considered that the promoter action of the T-element is reduced. On the other hand, when the T-element is contained in a large amount exceeding 50 at. %, it is considered that the number of the main active sites constituted of Pt sites and Ru sites decreases and the activity of the catalyst is therefore degraded. A more preferable range of the amount z of the T-element is 10 to 35 at. %.

There is also the case where the activity is improved by adding other metal elements and particularly at least one metal element among W, Ni, Mo, Ta, Ti, Zr, Cr and Co to the catalyst particles represented by formula 1, above. The amount of metal elements to be added is desirably 5 to 30 at. %.

In this embodiment, methanol oxidation activity was more improved by adding Sn and an M-element (one or more types selected from V, Nb, Hf and W) to PtRu. The amount u of Sn in the catalyst particles represented by formula 2, above, is preferably 0.5 to 12 at. %. When Sn is contained in an amount less than 0.5 at. % or exceeding 12 at. %, the promoter action of Sn is not obtained sufficiently. A preferable range of the amount of u of Sn is 1 to 10 at. %.

In the catalyst using Sn and the M-element, the M-elements bonded to other elements by a metal bond are present. The area of the peak derived from the metal bond of the M-element is 15% or more of the area of the peak derived from the oxygen bond of the M-element in an XPS spectrum (including 100%). Also, it is considered that the M-element put into a metallic state exists within a region to a depth of several nm from the surface of the catalyst particles. Moreover, because nano-particles made of a M-element cannot exist stably in the atmosphere, it is considered that alloy particles made of the M-element, Pt and Ru exist in the catalyst of the embodiment. The X-ray diffraction (XRD) spectrum of the catalyst particles used in the embodiment was analyzed and as a result, the position of the main peak is different from that of the case of a PtRu alloy. It is estimated that the alloy structure was changed by the addition of the M-element. In this case, the interplanar spacing at the main peak of the catalyst particles used in the embodiment is 2.16 to 2.25 Å. The composition and production process of the catalyst are important to obtain the specific mixing state of Pt, Ru and the M-element which provides high activity.

The catalyst particles represented by formula 2, above, may contain an A-element constituted of at least one element selected from the group consisting of Rh, Os, Ir, Mo, Ti and Ni. The amount t of the A-element is 25 at. % or less to obtain the effect of improving the activity of the catalyst.

There is also the case where the activity is improved by adding other metal elements and particularly at least one metal element among Mo, Ta, Ti, Zr, Cr and Co to the catalyst particles represented by formula 2, above. The amount of metal elements to be added is desirably 5 to 30 at. %.

The catalyst used in the embodiment permits oxygen to be contained. This is because there are opportunities afforded for adhesion of oxygen to the surface of the catalyst during the synthesis process or when the catalyst is stored and for oxidation of the surface of the catalyst when the catalyst is subjected to surface oxidation treatment such as washing with an acid. There is the case where when the surface is oxidized a little, the output and stability are improved. The content of oxygen in the catalyst is desirably 25 at. % or less. When the content of oxygen exceeds 25 at. %, there is the case where the activity of the catalyst is significantly degraded.

When the catalyst particles used in the embodiment are nano-microparticles, the highest activity is obtained. The average particle diameter of the catalyst particles is desirably 10 nm or less. This is because if the average particle diameter exceeds 10 nm, there is a risk that the activity efficiency of the catalyst is significantly degraded. The average particle diameter is more preferably in a range from 0.5 to 10 nm. This is because when the average particle diameter is less than 0.5 nm, it is difficult to control the catalyst synthesis process, leading to high catalyst synthesis cost. As the catalyst particles, primary particles having an average particle diameter of 10 nm or less may be used. Coagulates (secondary particles) of these primary particles can also be used.

Examples of the conductive carrier include carbon black. However, the conductive carrier is not limited to carbon black. Any carrier superior in conductivity and stability can be used. Nano-carbon materials, for example, nano-particles having a fiber form, tube form or coil form have been developed in recent years. It is considered to be possible that the activity is more improved if the catalyst particles used in the embodiment are supported by these carbon materials in which the surface condition is different from the surface condition of the carbon black. Besides these carbon materials, conductive ceramics material may be used as the carrier. It is expected that a higher synergetic effect is obtained by ceramics carrier and catalyst particles.

Next, a method of manufacturing the catalyst according to this embodiment will be explained. The catalyst according to the embodiment is manufactured by a sputtering method or deposition method. These methods produce the catalyst which has a metal bond and a specific mixing state more easily than solution reaction methods such as impregnating method, precipitation method or colloid method. It is difficult to produce the catalyst of this embodiment by a known solution reaction method. According to a method in which a polynuclear complex of Pt, Ru and the T-element is produced, and the carrier is impregnated with the polynuclear complex and then reduced, the catalyst of the embodiment is not obtained because it is difficult to synthesize the polynuclear complex. It is therefore considered that the production cost is increased. If the catalyst of the embodiment is produced by an electrodeposition method or an electrophoresis method, it is difficult to obtain nano-particles and also, it is considered that the production cost is increased.

A method in which the catalyst particles are supported on a conductive carrier by a sputtering method will be explained. FIG. 1 is a schematic of this production method.

First, particles or fiber-form conductive carrier 1 are dispersed sufficiently. Then, the dispersed support 1 is poured into a holder 2 arranged in a chamber (not shown) of a sputter (not shown) and a catalyst metal 3 is deposited on the carrier by sputtering with stirring in the direction shown by the arrow. The temperature of the carrier is designed to be desirably 400° C. or less during sputtering. When the temperature is higher than the above temperature, there is the case where phase separation arises in the catalyst particles, leading to unstable catalytic activity. Also, the lower limit of the carrier temperature is designed to be desirably 10° C. to decrease the cost necessary to cool the carrier. In this case, the temperature of the carrier may be measured by a thermocouple. Also, the stirring is important to attain uniform deposition of the catalyst particles. When no stirring is conducted, the distribution of the catalyst is uneven, which degrades the characteristics of a fuel cell.

The catalyst particles of the embodiment may be supported on a porous paper containing conductive carbon fibers, an electrode diffusion layer or an electrolyte membrane by sputtering. In this case, it is necessary to manufacture the catalyst particles having a nanosize by adjusting the process. Also, it is desirable to set the temperature of the porous paper to 400° C. or less in the same manner as above. There is the case where the activity is more improved by carrying out washing with an acid or heat treatment after the catalyst particles are formed by a sputtering method or a deposition method. The reason is considered to be that the structure or surface structure of the catalyst is made more appropriate by the washing with an acid or heat treatment. The washing with an acid may be carried out using any acid solution as long as the acid solution is an aqueous acid solution. In this embodiment, an aqueous sulfuric acid is used. The heat treatment is desirably carried out in the atmosphere of a temperature of 10 to 400° C. and an oxygen partial pressure less than 5%, after the sputtering method or the deposition method. Also, other materials such as carbon and the structural metal elements may be formed simultaneously by sputtering or deposition because it is easy to form microparticles. In the embodiment, the catalyst metal element and a metal, such as Cu and Zn, having high solubility are formed simultaneously by sputtering or deposition and then Cu and Zn can be removed by, for example, washing with an acid.

The inventors of the present invention have made earnest studies as to the relationship between catalyst synthetic process and catalyst composition to obtain a highly active and stable catalyst. As a result, the inventors have found that if catalyst particles represented by the following formula (3) or (6) are formed on a conductive carrier kept at 400° C. or less by a sputtering method or a deposition method when a T1 element and X1 element are compounded in a PtRu alloy, the T1 element can be bound with other elements such as Pt and Ru by a metal bond, thereby obtaining a highly active and stable catalyst.

$$Pt_xRu_yT1_aX1_b \qquad (3)$$

where the T1 element is at least one element selected from the group consisting of V, W and Mo, the X1 element is at least one element selected from the group consisting of Nb, Cr, Zr and Ti, x is 20 to 70 at. %, y is 10 to 50 at. %, "a" is 1 to 30 at. % and b is 0.5 to 20 at. %.

$$Pt_xRu_yT1_aX2_cAl_d \qquad (6)$$

where the T1 element is at least one element selected from the group consisting of V, W and Mo, the X2 element is at least one element selected from the group consisting of Nb, Cr, Zr, Ta and Ti, the Al element is at least one element selected from the group consisting of Sn, Hf, Ni, Rh, Os and Ir, x is 20 to 70 at. %, y is 10 to 50 at. %, "a" is 1 to 30 at. %, c is 0.5 to 20 at. % and d is 0.5 to 30 at. %.

An embodiment of the present invention will be explained.

First, explanations will be furnished as to the catalyst.

Pt and Ru are major catalyst elements. Pt is significantly effective on oxidation of hydrogen and a dehydrogenation reaction of organic fuels, and Ru is very effective to restrain CO poisoning. When the amount of Ru is small, insufficient activity is obtained. Therefore, it is preferable that x be 20 to 70 at. % and y be 10 to 50 at. %. There is the case where Pt having an oxygen bond other than a metal bond exists in the Pt contained in the catalyst according to this embodiment. It is considered that a layer constituted of an oxide of Pt, Ru, T1 element, X1 element or X2 element exists on the surface of the catalyst. It is inferred that the oxide layer brings about high activity and high stability. Also, there is the case where the activity of the catalyst is improved by substituting other metals for a part of Pt and Ru. Because noble metals are particularly superior in chemical stability, Rh, Os, Ir, Pd, Ag or Au is desirable.

T1 and X1 are respectively a promoter. The inventors of the present invention have found that high activity and high stability are obtained by adding one or more elements selected from W, V and Mo as the T1 element and one or more elements selected from the group consisting of Nb, Cr, Zr and Ti as the X1 element. Although the mechanism providing high activity and high stability is not clarified, the main reason why such high activity and high stability is obtained is considered to be due to the surface structure and electronic condition of the catalyst having the specific mixing state of each element. The existence of a metal bond between the T1 element and Pt/Ru is considered to be particularly important to improve the activity. If the catalyst particles are synthesized by a solution reaction method, reducing reactions of W, V, Mo and the like are scarcely caused, and thus, the formation of an alloy of these elements, Pt and Ru proceeds with difficulty. Therefore, a large part of the obtained catalyst particles are a mixture of the PtRu microparticles and microparticles of an oxide of the T1 element. When the catalyst particles synthesized by a solution reaction method is subjected to surface analysis using an X-ray photoelectron spectrometry (XPS), almost of the T1 elements are bound with other elements by an oxygen bond. On the other hand, in the catalyst of the embodiment, a T1 element bound with other elements by a metal bond exists, and therefore, the catalyst of the embodiment satisfies the following equation (4) in the XPS spectrum.

$$0 \leq (C_{OxygenT1}/C_{metalT1}) \leq 4 \quad (4)$$

where $C_{OxygenT1}$ is the amount of the T1 element having an oxygen bond which is obtained by the above XPS spectrum, and for example, the area of the peak derived from the oxygen bond of the T1 element in the above XPS spectrum is used as $C_{OxygenT1}$. Also, $C_{metalT1}$ is the amount of the T1 element having a metal bond which is obtained by the above XPS spectrum, and for example, the area of the peak derived from the metal bond of the T1 element in the above XPS spectrum is used as $C_{metalT1}$.

A more preferable range is as follows:

$0 \leq (C_{OxygenT1}/C_{metalT1}) \leq 2$. Because XPS measurement can only detect photoelectrons (signals) existing to a depth of about several nm from the surface of a sample, it is therefore considered that the T1 element bound with other atoms by a metal bond exists within a region to a depth of several nm from the surface of the catalyst particles according to this embodiment. Moreover, because nano-particles made of a T-element cannot exist stably in the atmosphere, it is considered that alloy particles of the T1 element, Pt and Ru exist in the catalyst according to the embodiment. In the case where an oxide layer is formed on the surface of the catalyst particles, the possibility is large that the area of the peak (signals) derived from the oxygen bond of the T1 element is higher than the area of the peak derived from the metal bond of the T1 element in an XPS spectrum, because the intensity of signals existing in the portion close to the surface occupies an extremely large part of the intensity of all signals detected by XPS measurement. The existence of the metal bond of the T1 element in the catalyst according to this embodiment can also be confirmed by the measurement of an extended X-ray absorption fine structure (EXAFS).

On the other hand, the addition of the X1 element is important to give high stability to the catalyst. The existence of an X1 element bound with an oxygen atom is difficult inside of the catalyst particles. Therefore, the X1 element bound with an oxygen atom exists in the surface of the catalyst particles, and it is therefore considered that the X1 element is most important for the formation of a surface oxide layer. An X1 element having an oxygen bond exists in the catalyst according to this embodiment, and the following equation (5) is established in a spectrum obtained by XPS.

$$0 \leq (C_{metalX1}/C_{OxygenX1}) \leq 2 \quad (5)$$

where $C_{metalX1}$ is the amount of the X1 element having a metal bond which is obtained by the above spectrum, and for example, the area of the peak derived from the metal bond of the X1 element in the above spectrum is used as $C_{metalX1}$. Also, $C_{OxygenX1}$ is the amount of the X1 element having an oxygen bond which is obtained by the above spectrum, and for example, the area of the peak derived from the oxygen bond of the X1 element in the above spectrum is used as $C_{OxygenX1}$.

A more preferable range is as follows:

$0 \leq (C_{metalX1}/C_{OxygenX1}) \leq 1$. It is to be noted that though various studies have been made as to the catalysts using an oxide of the X1 element as the carrier of the catalyst so far, only insufficient improvement in characteristics has been obtained. In this embodiment, the T1 element and the X1 element are added compositely to the catalyst particles by a sputtering or a deposition method to obtain high activity and high stability. The composition of the catalyst and the process are important to obtain a specific mixing state of Pt or Ru with the Ti element or X1 element and nano-particle structure of the catalyst which bring about high activity and high stability.

The amount "a" of the T1 element in the catalyst particles is preferably 1 to 30 at. %. When the amount is less than 1 at. %, it is estimated that the promoter effect of the T1 element is low. Also, if the T1 element is compounded in a large amount exceeding 30 at. %, the number of major active sites constituted by Pt sites and Ru sites is decreased and it is thought that the catalyst activity is degraded. The amount "a" of the T1 element is more preferably in a range from 2 to 20 at. %.

The amount b of the X1 element in the catalyst particles is preferably 0.5 to 20 at. %. When the amount is less than 0.5 at. %, it is estimated that the promoter effect of the X1 element is low. Also, if the X1 element is compounded in a large amount exceeding 20 at. %, the number of major active sites constituted by Pt sites and Ru sites is decreased and it is thought that the catalyst activity is degraded. The amount b of the X1 element is more preferably in a range from 1 to 15 at. %.

In this embodiment, the methanol oxidation activity of the catalyst is more improved by adding the A1 element, specifically, one or more elements selected from the group consisting of Sn, Hf, Ni, Rh, Os and Ir, to PtRu. Particularly, Sn, Hf or Ni is preferable as the A1 element. When the A1 element is added, high activity and high stability are obtained by adding one or more elements selected from W, V and Mo as the T1 element and one or more elements selected from Nb, Cr, Zr, Ta and Ti as the X2 element. In the catalyst using the A1 element, the T1 element and the X2 element, the T1 element having a metal bond and the X2 element having an oxygen bond exist and the aforementioned equation (4) and the following equation (7) are established in the spectrum by XPS.

$$0 \leq (C_{metalX2}/C_{OxygenX2}) \leq 2 \quad (7)$$

where $C_{metalX2}$ is the amount of the X2 element having a metal bond which is obtained by the above spectrum, and for example, the area of the peak derived from the metal bond of the X2 element in the above spectrum is used as $C_{metalX2}$. $C_{OxygenX2}$ is the amount of the X2 element having an oxygen bond which is obtained by the above spectrum, and for example, the area of the peak derived from the oxygen bond of the X2 element in the above spectrum is used as $C_{OxygenX2}$.

A more preferable range is as follows:

$0 \leq (C_{metalX2}/C_{OxygenX2}) \leq 1$.

The composition of the catalyst and the process are important to obtain a specific nano-particle structure and a specific mixing electron state which bring about high activity and high stability. The amount d of the A1 element in the catalyst particles represented by the above formula (4) is preferably 0.5 to 30 at. %. When the A1 element is contained in an amount less than 0.5 at. % or exceeding 30 at. %, the promoter effect of the A1 element is insufficiently obtained. The amount d of the A1 element is more preferably in a range from 1 to 25 at. %.

The amount c of the X2 element in the catalyst particles represented by the aforementioned formula (4) is preferably 0.5 to 20 at. %. When the amount is less than 0.5 at. %, it is estimated that the promoter effect of the X2 element is low. Also, if the X2 element is compounded in a large amount exceeding 20 at. %, the number of major active sites constituted by Pt sites and Ru sites is decreased and it is thought that the catalyst activity is degraded. The amount c of the X2 element is more preferably in a range from 1 to 15 at. %.

The catalyst used in the embodiment permits oxygen to be contained. As mentioned in the foregoing paragraph, it is considered that there is a high possibility of an oxide layer being formed on the surface of the catalyst particles and that it is highly possible that the oxide layer contributes to the high activity and high stability of the catalyst according to this embodiment. The content of oxygen in the catalyst according to the embodiment is preferably 25 at. % or less. When the content of oxygen exceeds 25 at. %, the activity of the catalyst may be significantly degraded. Also, there is the case where the activity of the catalyst is improved by adding other metal elements, specifically, at least one metal selected from the group consisting of Mn, Fe, Co, Cu and Zn, to the catalyst particles represented by the formulae (3) and (6). The amount of these metals to be added is desirably 1 to 20 at. %.

The catalyst according to this embodiment permits the inclusion of 0.1 at. % or less of impurity elements, for example, P, S and Cl. These elements possibly get mixed in the catalyst during the production of the catalyst or membrane electrode assembly or treating process. When the content is 0.1 at. % or less, the catalyst is reduced in the deterioration of characteristics. The surface structure of the catalyst according to this embodiment is considered to have a high tolerance.

When the catalyst particles according to this embodiment are nano-microparticles, the highest activity is obtained. The average particle diameter of the catalyst particles is preferably 10 nm or less. This is because if the average particle diameter exceeds 10 nm, there is a fear that the activity efficiency of the catalyst is significantly dropped. The average particle diameter is more preferably in a range from 0.5 to 10 nm. This is because when the average particle diameter is less than 0.5 nm, it is difficult to control the catalyst synthesis process, leading to high catalyst synthesis cost. It is to be noted that as the catalyst particles, primary particles having an average particle diameter of 10 nm or less may be used. Coagulates (secondary particles) of the primary particles may also be used. Also, the catalyst particles may be carried on a conductive carrier. Examples of the conductive carrier may include carbon black. However, the conductive carrier is not limited to carbon black. Any carrier superior in conductivity and stability can be used. Nano-carbon materials, for example, nano-particles having a fiber form, tube form or coil form have been developed in recent years. It is considered to be possible that the activity is more improved if the catalyst particles according to this embodiment are supported by these carbon materials having a surface condition different from that of the carbon black. Besides these carbon materials, a conductive ceramics material may be used as the carrier. It is expected that a higher synergetic effect is obtained by a ceramics carrier and catalyst particles.

Next, a method of manufacturing a catalyst according to this embodiment will be explained. The catalyst according to this embodiment is manufactured by, for example, a sputtering method or deposition method. These methods produce a catalyst which has a metal bond and a specific mixing state more easily than a solution reaction method such as an impregnating method, precipitation method or colloid method. It is difficult to manufacture the catalyst of this embodiment by the conventional solution reaction method. According to a method in which a polynuclear complex of Pt, Ru and the T1 element having a metal bond is produced, and the carrier is impregnated with the polynuclear complex and then reduced, the catalyst of the embodiment is not obtained because it is difficult to synthesize the polynuclear complex. It is therefore considered that the production cost is increased. If the catalyst of the embodiment is produced by an electrodeposition method or an electrophoresis method, it is difficult to produce the catalyst particles having nanosize and also, it is considered that the production cost is increased. When a sputtering method or a deposition method is carried out, an alloy target or each metal target of the structural elements may be used to carry out simultaneous sputtering or simultaneous deposition.

A method in which the catalyst particles are supported on a conductive carrier by a sputtering method will be explained. First, particles or fiber-form conductive carrier are dispersed sufficiently. Then, the dispersed carrier is poured into a holder disposed in a sputter chamber and a catalyst metal of a catalyst is supported on the carrier by sputtering with stirring. The temperature of the carrier is designed to be preferably 400° C. or less during sputtering. When the temperature is higher than the above temperature, phase separation may arise in the catalyst particles, leading to unstable catalytic activity. Also, the lower limit of the carrier temperature is designed to be preferably 10° C. to decrease the cost necessary to cool the carrier. In this case, the temperature of the carrier may be measured by a thermocouple. Also, the stirring is important to attain uniform distribution of the catalyst particles. When no stirring is conducted, the distribution of the catalyst particles is uneven, which degrades the characteristics of the fuel cell.

It is to be noted that the catalyst of this embodiment may be supported on a porous paper containing conductive carbon fibers, an electrode diffusion layer or an electrolytic membrane by sputtering. In this case, it is necessary to form the catalyst in the shape of nano-particles by controlling the process. Also, it is preferable to set the temperature of the porous paper to 400° C. or less in the same manner as above.

There is also the case where the activity is more improved by carrying out washing with an acid, alkali treatment or heat treatment after the catalyst particles are formed by a sputtering method or a deposition method. This reason is considered to be that the structure or surface structure of the catalyst is made more proper by the washing with an acid, alkali treatment or heat treatment. The washing with an acid may be carried out using any acid solution as long as the acid solution is an aqueous acid solution. In this embodiment, an aqueous sulfuric acid solution is used. The alkali treatment may be carried out using any alkali as long as the alkali is an aqueous alkali solution. Or, it is considered that the structure or surface structure of the catalyst is made more proper by the heat treatment. The heat treatment is preferably carried out in the atmosphere of a temperature of 10 to 400° C. and an oxygen partial pressure less than 5%, after the sputtering method or the deposition method. Also, other materials such as carbon and the structural metal elements may be formed simultaneously by sputtering or deposition because it is easy to form microparticles. In this embodiment, the catalyst metal element and a metal, such as Cu and Zn, having high solubility are formed simultaneously by sputtering or deposition and then Cu and Zn can be removed by, for example, washing with an acid.

A membrane electrode assembly according to the embodiment comprises an anode, a cathode and a proton conductive membrane disposed between the anode and the cathode. Also, a fuel cell according to the embodiment comprises this membrane electrode assembly.

Figure 2:
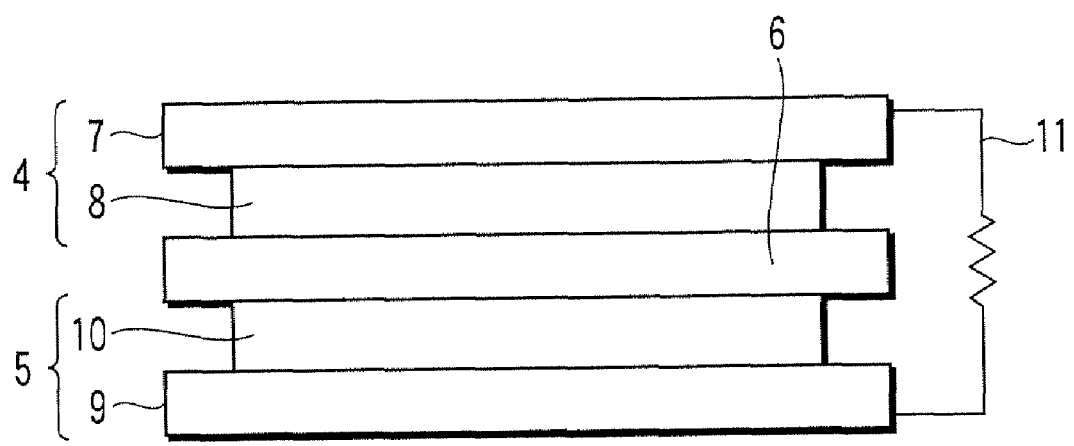
FIG. 2 is a schematic showing a fuel cell according to an embodiment.

FIG. 2 is a side view showing a fuel cell according to an embodiment.

The membrane electrode assembly (MEA) shown in FIG. 2 is provided with an anode 4, a cathode 5 and a proton conductive membrane 6. The anode 4 includes a diffusion layer 7 and an anode catalyst layer 8 laminated on the diffusion layer 7. The cathode 5 includes a diffusion layer 9 and a cathode catalyst layer 10 laminated on the diffusion layer 9. The anode 4 and the cathode 5 are laminated such that the anode catalyst layer 8 faces the cathode catalyst layer 10 through a proton conductive membrane 6. In FIG. 2, the reference symbol 11 represents an external circuit.

The anode catalyst layer 8 contains the aforementioned catalyst. On the other hand, for example, Pt may be used for the cathode catalyst contained in the cathode catalyst layer 10. The cathode catalyst may be used in an unsupported state though it may be supported on the carrier.

In the diffusion layers 7 and 9, a conductive porous sheet may be used. A sheet formed of an air permeable or liquid permeable material such as carbon cloth or carbon paper may be used for the conductive porous sheet.

Any material may be used as the proton conductive material contained in the anode catalyst layer, cathode catalyst layer and proton conductive membrane without any particular limitation insofar as it is a material capable of transferring protons. Examples of the proton conductive material include, though not particularly limited to, fluororesins having a sulfonic acid group such as Nafion (manufactured by Du Pont), Flemion (manufactured by Asahi Kasei Corporation) and Aciprex (manufactured by Asahi Glass Co. Ltd.) and inorganic materials such as tungstic acid and phosphorous tungstate.

The fuel cell according to the embodiment comprises the aforementioned MEA, a member which is configured to supply fuel to the anode and a member which is configured to supply an oxidant to the cathode. The number of MEAs to be used may be one or more. The use of plural MEAs makes it possible to obtain a higher cell stack voltage. As the fuel, methanol, ethanol, formic acid or an aqueous solution containing one or more types selected from these compounds may be used.

Although embodiments of the present invention will be described below, the invention is not limited to these examples.

Examples 1 to 13, 18, 20 and 21, Comparative Examples 1 to 3

First, a carbon black carrier (trade name: Vulcan XC72, manufactured by Cabot Corporation, specific surface area: about 230 m$^2$/g) was sufficiently dispersed. Then, the dispersed carrier was placed in a holder disposed in a chamber of an ion beam sputtering apparatus and Ar gas was flowed after the pressure was dropped to reach a vacuum of 3×10$^{-6}$ Torr or less. A metal or an alloy was used as the target such that it had each composition (at. %) shown in Table 1, to carry out sputtering with stirring the carrier kept at the carrier temperature shown in Table 1, thereby making the catalyst particles to be supported on the carrier. The obtained product washed with an aqueous sulfuric acid solution (sulfuric acid: 100 g, water: 200 g) and then washed with water, followed by drying.

Examples 14 to 17

First, a carbon black carrier (trade name: Vulcan XC72, manufactured by Cabot Corporation, specific surface area: about 230 m$^2$/g) was sufficiently dispersed. Then, the dispersed carrier was placed in a holder disposed in a chamber of a laser pulse deposition apparatus and the vacuum was dropped to 3×10$^{-6}$ Torr or less. Then, a metal or alloy target was used as the target such that it had each composition (at. %) shown in Table 1, to carry out deposition with stirring the carrier kept at the carrier temperature shown in Table 1, thereby making the catalyst particles to be supported on the carrier. The obtained product washed with an aqueous sulfuric acid solution (sulfuric acid: 100 g, water: 200 g) and then washed with water, followed by drying.

Example 19

A supported catalyst was synthesized in the same manner as in Example 1 except that the carrier was not stirred.

Comparative Example 4

A supported catalyst having the same composition was produced in the same method as in Example 2 described in JP-A 2005-259557 (KOKAI). First, 500 mg of carbon black (trade name: Vulcan XC72, manufactured by Cabot Corporation, specific surface area: about 230 m$^2$/g) was added to 1000 mL of an ethanol solution containing vanadium chloride in a vanadium metal amount of 100 mg. The mixture was sufficiently stirred to disperse carbon black uniformly. The mixture was heated to 55° C. with stirring to remove ethanol by evaporation. Then, the residue obtained in the above method was heated at 300° C. for 3 hours with flowing hydrogen gas at a flow rate of 50 mL/min to carry vanadium on carbon black. Then, 300 mL of a cyclohexane solution containing 1,5-cyclooctadienedimethylplatinum in a platinum metal amount of 317.7 mg was mixed with 40 mL of an ethanol solution containing ruthenium chloride in a ruthenium metal amount of 82.3 mg. The above vanadium supported carbon black was added in the mixed solution, which was thoroughly stirred to disperse the vanadium supported carbon black uniformly and the dispersion solution was heated to 55° C. with stirring to remove a solvent by evaporation. Then, the residue obtained in the above method was heated at 300° C. for 3 hours with flowing hydrogen gas at a rate of 50 mL/min, to carry platinum, ruthenium and vanadium on the carbon black, thereby obtaining a supported catalyst.

Comparative Example 5

A supported catalyst was manufactured in the same manner as in Comparative Example 4 except for the composition of the catalyst. The composition of the catalyst used in Comparative Example 4 (Example 2 in JP-A 2002-259557 [KOKAI]) is different from that represented by formula 1 or 2, above, and the composition of the catalyst in Comparative Example 5 is the same as that of Example 1.

Each of the aforementioned catalyst was subjected to XPS measurement using Quantum-2000 manufactured by PHI Company. A neutralization gun (electronic gun, argon gun) was used to make charge-up compensation and charge correction (C1s: C—C=284.6 eV). It was confirmed that the area of the peak derived from a metal bond of each main T-element in each XPS spectrum obtained in Examples 1 to 4, 10 to 15, 18 and 19 and Comparative Examples 2 and 3 was 15% or more of the area of the peak derived from the oxygen bond of the each main T-element in each XPS spectrum. It was also confirmed that the area of the peak derived from a metal bond of each main M-element in each XPS spectrum obtained in Examples 5 to 9, 16, 17, 20 and 21 was 15% or more of the area of the peak derived from the oxygen bond of the each main M-element in each XPS spectrum. The main T-element means a T-element having the largest content in the case where the plural types of T-element are contained in the catalyst particles. The main M-element means a M-element having the largest content in the case where the plural types of M-element are contained in the catalyst particles. In the case of, for example, the catalyst particles of Example 5, the main M-element is V. Specifically, with regard to V-element, a component having a metal bond and a component having an oxide bond were isolated from the peaks at which the bond energies were 512 to 514 eV and 516 to 518 eV respectively by using a V2p spectrum. With regard to Hf-element, a component having a metal bond and a component having an oxide bond were isolated from the peaks at which the bond energies were 13 to 16 eV and 16 to 17 eV respectively by using a V4f spectrum. With regard to Nb-element, a component having a metal bond and a component having an oxide bond were isolated from the peaks at which the bond energies were 202 to 205 eV and 203 to 209 eV respectively by using a Nb3d spectrum. With regard to W-element, a component having a metal bond and a component having an oxide bond were isolated from the peaks at which the bond energies were 30 to 33 eV and 33 to 36 eV respectively by using a W4f spectrum. The area of the peak derived from a metal bond when the area of the peak derived from an oxygen bond was 100% is shown in the following Table 1. The above V elements in Comparative Examples 4 and 5 which were manufactured by a solution reaction method were found to be almost in an oxidized state.

The supported catalysts obtained in Examples 1 to 21 were subjected to X-ray diffraction analysis (XRD) to find that the interplanar spacing at the main peaks of the diffraction pattern was in a range from 2.16 to 2.25 Å.

The average particle diameter of the catalyst particles of each supported catalyst was measured as follows: A TEM was used to observe in five optional visual fields and each diameter of 20 particles was measured in each visual field to calculate an average of the diameters of a total of 100 particles as an average particle diameter. The obtained average particle diameter is shown in the following Table 1.

The supported catalysts obtained in Examples 1 to 21 and Comparative Examples 1 to 5 were used as anode catalysts.

As each counter cathode, a standard cathode (Pt catalyst supported by carbon black, commercially available product, manufactured by Tanaka Kikinzoku Co.) was used. A fuel cell electrode, a membrane electrode assembly and a single cell were manufactured and evaluated in the following methods.

<Anode>

3 g of each catalyst obtained was weighed. Each supported catalyst, 8 g of pure water, 15 g of 20% Nafion solution and 30 g of 2-ethoxyethanol were thoroughly stirred to be dispersed and then, made into a slurry. This slurry was applied to carbon paper (manufactured by Toray Industries, Inc.) which had been subjected to water-repellent treatment and has a thickness of 350 μm, by a control coater and dried to produce an anode with a noble metal catalyst having a loading density of 1 mg/cm$^2$.

<Cathode>

First, 2 g of a Pt catalyst manufactured by Tanaka Kikinzoku Co. was weighed. This Pt catalyst, 5 g of pure water, 5 g of a 20% Nafion solution and 20 g of 2-ethoxyethanol were thoroughly stirred to be dispersed and then, made into a slurry. This slurry was applied to carbon paper (manufactured by Toray Industries, Inc.) which had been subjected to water-repellent treatment and has a thickness of 350 μm, by a control coater and dried to produce a cathode with a noble metal catalyst having a loading density of 2 mg/cm$^2$.

<Production of a Membrane Electrode Assembly>

The cathode and the anode were cut into a 3.2 by 3.2 cm square such that the electrode area of each electrode was 10 cm$^2$. A Nafion 117 (manufactured by Du Pont) was sandwiched as a proton conductive membrane between the cathode and the anode. And then these electrodes was applied to heat press at 125° C. under a pressure of 30 kg/cm$^2$ for 10 min., to manufacture a membrane electrode assembly.

This membrane electrode assembly and a channel plate were used to produce a single cell of a fuel direct supply type polymer electrolyte fuel cell. A 1 M methanol aqueous solution as a fuel was supplied to the anode in this single cell at a rate of 0.6 mL/min., and at the same time, air was supplied to the cathode at a rate of 200 mL/min., to output at a current density of 150 mA/cm$^2$ while keeping the cell temperature at 65° C. Then, the voltage of the cell after 30 minutes was measured. The results are shown in the following Table 1.

TABLE 1

| | Catalyst composition | Ratio of peak areas (%) | Peak magnification of main T1 element (times) | Peak magnifications of main X1 and X2 elements (times) |
|---|---|---|---|---|
| Example 1 | $Pt_{40}Ru_{40}V_{20}$ | 50 | 2 | — |
| Example 2 | $Pt_{50}Ru_{40}V_{10}$ | 70 | 1.4 | — |
| Example 3 | $Pt_{50}Ru_{30}Hf_{20}$ | 20 | — | — |
| Example 4 | $Pt_{50}Ru_{30}Nb_{20}$ | 25 | — | 0.25 |
| Example 5 | $Pt_{45}Ru_{35}V_{15}W_5$ | 30 | 3.3 | — |
| Example 6 | $Pt_{50}Ru_{26}Sn_6W_{18}$ | 70 | 1.4 | — |
| Example 7 | $Pt_{45}Ru_{35}Sn_6V_{14}$ | 30 | 3.3 | — |
| Example 8 | $Pt_{45}Ru_{30}Rh_8V_{10}Sn_7$ | 50 | 2 | — |
| Example 9 | $Pt_{45}Ru_{30}Os_{10}V_{10}Sn_5$ | 60 | 1.7 | — |
| Example 10 | $Pt_{50}Ru_{45}V_5$ | 90 | 1.1 | — |
| Example 11 | $Pt_{35}Ru_{15}V_{50}$ | 15 | 6.7 | — |
| Example 12 | $Pt_{45}Ru_{50}Hf_5$ | 100 | — | — |
| Example 13 | $Pt_{32}Ru_{17}Hf_{50}$ | 20 | — | — |
| Example 14 | $Pt_{60}Ru_{35}Nb_5$ | 80 | — | 0.8 |
| Example 15 | $Pt_{30}Ru_{20}Nb_{50}$ | 15 | — | 0.15 |
| Example 16 | $Pt_{30}Ru_{20}Os_8Ir_{15}W_{15}Sn_{12}$ | 60 | 1.7 | — |
| Example 17 | $Pt_{35}Ru_{24.5}Os_{10}W_{15}Ni_{15}Sn_{0.5}$ | 50 | 2 | — |
| Example 18 | $Pt_{40}Ru_{40}V_{20}$ | 40 | 2.5 | — |
| Example 19 | $Pt_{40}Ru_{40}V_{20}$ | 30 | 3.3 | — |
| Example 20 | $Pt_{30}Ru_{22}W_{35}Sn_8Mo_5$ | 60 | 1.7 | — |
| Example 21 | $Pt_{30}Ru_{20}Os_{10}Ti_5W_{25}Sn_{10}$ | 50 | 2 | 0.5 |

TABLE 1-continued

| | | | | |
|---|---|---|---|---|
| Comparative Example 1 | $Pt_{50}Ru_{50}$ | — | — | — |
| Comparative Example 2 | $Pt_{50}Ru_{48}V_2$ | 90 | 1.1 | — |
| Comparative Example 3 | $Pt_{20}Ru_{20}V_{60}$ | 20 | 5 | — |
| Comparative Example 4 | $Pt_{37}Ru_{18}V_{45}$ | 0 | Almost oxygen bond | — |
| Comparative Example 5 | $Pt_{40}Ru_{40}V_{20}$ | 0 | Almost oxygen bond | — |

| | Average particle diameter (nm) | Method of producing catalyst | Carrier temperature | Stirring | Voltage (V) |
|---|---|---|---|---|---|
| Example 1 | 3 | Sputtering method | 50° C. or less | Sufficiently | 0.48 |
| Example 2 | 3 | Sputtering method | 50° C. or less | Sufficiently | 0.50 |
| Example 3 | 3 | Sputtering method | 50° C. or less | Sufficiently | 0.47 |
| Example 4 | 3 | Sputtering method | 50° C. or less | Sufficiently | 0.46 |
| Example 5 | 3 | Sputtering method | 50° C. or less | Sufficiently | 0.49 |
| Example 6 | 3 | Sputtering method | 50° C. or less | Sufficiently | 0.50 |
| Example 7 | 3 | Sputtering method | 50° C. or less | Sufficiently | 0.52 |
| Example 8 | 3 | Sputtering method | 50° C. or less | Sufficiently | 0.53 |
| Example 9 | 3 | Sputtering method | 50° C. or less | Sufficiently | 0.52 |
| Example 10 | 3 | Sputtering method | 150° C. or less | Sufficiently | 0.46 |
| Example 11 | 4 | Sputtering method | 250° C. or less | Sufficiently | 0.47 |
| Example 12 | 5 | Sputtering method | 350° C. or less | Sufficiently | 0.46 |
| Example 13 | 3 | Sputtering method | 20° C. or less | Sufficiently | 0.46 |
| Example 14 | 3 | Deposition method | 150° C. or less | Sufficiently | 0.47 |
| Example 15 | 4 | Deposition method | 250° C. or less | Sufficiently | 0.47 |
| Example 16 | 4 | Deposition method | 250° C. or less | Sufficiently | 0.49 |
| Example 17 | 5 | Deposition method | 250° C. or less | Sufficiently | 0.50 |
| Example 18 | 5 | Sputtering method | 500° C. or less | Sufficiently | 0.44 |
| Example 19 | 3 | Sputtering method | 50° C. or less | None | 0.43 |
| Example 20 | 3 | Sputtering method | 50° C. or less | Sufficiently | 0.50 |
| Example 21 | 3 | Sputtering method | 50° C. or less | Sufficiently | 0.49 |
| Comparative Example 1 | 3 | Sputtering method | 50° C. or less | Sufficiently | 0.42 |
| Comparative Example 2 | 3 | Sputtering method | 50° C. or less | Sufficiently | 0.42 |
| Comparative Example 3 | 3 | Sputtering method | 50° C. or less | Sufficiently | 0.40 |
| Comparative Example 4 | 3 | Solution reaction method | — | — | 0.30 |
| Comparative Example 5 | 3 | Solution reaction method | — | — | 0.35 |

As shown in the results of Table 1, it is found that when Examples 1 to 21 are compared with Comparative Example 1, the supported catalysts of Examples 1 to 21 each have higher activity than the PtRu catalyst of Comparative Example 1. A comparison of Examples 1 and 2 with Comparative Examples 2 and 3 reveals that when the amount z of a T-element exceeds 5 to 50 at. %, high activity over the PtRu catalyst cannot be obtained. Also, a comparison of Examples 1 and 2 with Examples 10 and 11 reveals that it is more desirable that the amount z of the T-element fall in 10 to 35 at. % to obtain high activity.

Making a comparison between Examples 1 to 13 and Example 18, it is found that higher activity is obtained in Examples 1 to 13 in which the conductive carrier was kept at a temperature of not more than 400° C. than in Example 18 in which the temperature of the conductive carrier exceeds 400° C.

It is also understood from a comparison of Examples 1 to 9 with Example 19 that higher activity is obtained in Examples 1 to 9 in which the conductive carrier was stirred when the supported catalyst was synthesized than in Example 19 in which no stirring is carried out.

The fuel cell of Comparative Example 4 which was produced in the same manner as in Example 2 of JP-A 2005-259557 (KOKAI) had the lowest fuel cell characteristics. This is considered to be due to the process and catalyst composition.

It has been confirmed that a reformed gas type polymer electrolyte fuel cell using the supported catalyst obtained in the above Examples has the same tendency as above. Therefore, the supported catalysts of the above embodiment are also more effective to prevent CO poisoning than the conventional Pt—Ru catalysts.

As is explained above, a highly active supported catalyst and a fuel cell that can attain high output can be provided by this embodiment.

Examples 22 to 56, Comparative Examples 6 to 25

First, a carbon black carrier (trade name: Vulcan XC72, manufactured by Cabot Corporation; specific surface area: about 230 m²/g) was sufficiently dispersed. Then, the dispersed carrier was placed in a holder disposed in a chamber of an ion beam sputtering apparatus, and Ar gas was flowed after the pressure was reduced to a vacuum of $3 \times 10^{-6}$ Torr or less. A metal or an alloy was used as the target such that it had each composition (at. %) shown in Tables 2 and 3, to carry out sputtering while stirring the carrier kept at the carrier temperature shown in Tables 2 and 3, thereby making the catalyst particles to be supported on the carrier. The obtained product washed with a sulfuric acid aqueous solution (sulfuric acid: 10 g; water: 200 g) and then washed with water, followed by drying.

Comparative Example 26

First, 500 mg of carbon black (trade name: Vulcan XC72, manufactured by Cabot Corporation, specific surface area: about 230 m²/g) was added to 1000 mL of an ethanol solution containing vanadium chloride in a vanadium metal amount of 31 mg and niobium chloride in a niobium metal amount of 6 mg. The mixture was sufficiently stirred to disperse carbon black uniformly. The mixture was heated to 55° C. with stirring to remove ethanol by evaporation. Then, the residue obtained in the above method was heated at 300° C. for 3 hours with flowing hydrogen gas at a flow rate of 50 mL/min to allow vanadium and niobium to be carried on carbon black. Then, 300 mL of a cyclohexane solution containing 1,5-cyclooctadienedimethylplatinum in a platinum metal amount of 309 mg was mixed with 40 mL of an ethanol solution containing ruthenium chloride in a ruthenium metal amount of 54 mg. The above carbon carrying vanadium and niobium was added in the mixed solution, which was thoroughly stirred to disperse carbon uniformly, and the dispersion solution was heated to 55° C. with stirring to remove a solvent by evaporation. Then, the residue obtained in the above method was heated at 300° C. for 3 hours with flowing hydrogen gas at a rate of 50 mL/min, to allow platinum, ruthenium, niobium and vanadium to be carried on carbon black, thereby obtaining a supported catalyst.

Example 57

First, using a carbon paper (trade name: Toray 120; 10 cm$^2$) as a substrate, each metal target was used so as to obtain each catalyst composition shown in Table 3 to carry out simultaneous sputtering to form a catalyst layer. A conductive porous layer was formed on the catalyst layer by simultaneous sputtering using a carbon and a Sn—Al target. The sputtering for the above catalyst layer and conductive porous layer repeated tens of times such that the loading density of a noble metal catalyst on an electrode was 1 mg/cm$^2$ to form an electrode having a laminate structure constituted of the catalyst layer and the carbon/metal mixing layer. Thereafter, the electrode was put into 50 wt % nitric acid at 60° C. to carry out acid treatment for 24 hours and washed with pure water, followed by drying. Moreover, the electrode was impregnated with Nafion® to produce an anode.

Each of the above various catalysts or electrodes was subjected to XPS measurement using Quantum-2000 manufactured by PHI Company. A neutralization gun (electronic gun, argon gun) was used to make charge-up compensation and charge collection (C1s: C—C=284.6 eV). Each standard of identification of a peak derived from a metal bond and a peak derived from an oxygen bond of each element is shown in Table 4. Specifically, with regard to V element, a peak at which the bond energy was in a range from 512 to 513 eV was identified as that of a metal bond and a peak at which the bond energy was in a range from 516 to 517 eV was identified as that of an oxygen bond by using a V2p spectrum. With regard to W element, a peak at which the bond energy was in a range from 31 to 34 eV was identified as that of a metal bond and a peak at which the bond energy was in a range from 36 to 40 eV was identified as that of an oxygen bond by using a W4f spectrum.

When plural types of T1 element are contained in the catalyst particles, a T1 element of the type contained in the largest amount is defined as a main T1 element. Also, in the case of the X1 and X2 elements, elements of the types contained in the largest amounts are defined as a main X1 element and a main X2 element, respectively. The results of measurement of the main T1 element, main X1 element and main X2 element of each catalyst are shown collectively in Tables 2 and 3.

A peak magnification factor $P_1$ of the main T1 element was calculated from the following equation (8).

$$P_1 = C_{OxygenT1}/C_{metalT1} \quad (8)$$

where $C_{OxygenT1}$ is the area of the peak based on an oxygen bond of the main T1 element and $C_{metalT1}$ is the area of the peak based on a metal bond of the main T1 element.

A peak magnification factor $P_2$ of the main X1 element or main X2 element was calculated from the following equation (9) or (10).

$$P_2 = C_{metalX1}/C_{OxygenX1} \quad (9)$$

$$P_2 = C_{metalX2}/C_{OxygenX2} \quad (10)$$

where $C_{metalX1}$ is the area of the peak based on a metal bond of the main X1 element and $C_{OxygenX1}$ is the area of the peak based on an oxygen bond of the main X1 element. $C_{metalX2}$ is the area of the peak based on a metal bond of the main X2 element and $C_{OxygenX2}$ is the area of the peak based on an oxygen bond of the main X2 element.

In the XPS spectra of Examples 22 to 57, as shown in Tables 2 and 3, it has been confirmed that the peak magnification factor $P_1$ of the main T1 element is 2 or less and the peak magnification factor $P_2$ of the main X1 element or main X2 element is 2 or less. It has been confirmed that the V element of Comparative Example 26 produced by the solution reaction method is put into an almost oxidized state. In this case, the sample measured above is a catalyst washed with an acid. There is the case where a catalyst before washed with an acid has a higher peak of an oxygen bond than the catalyst after washed with the acid. This is largely due to unstable oxide layers. It has been confirmed that when no acid washing process is carried out, the oxide layer of the catalyst is changed naturally to a stable layer during the power generation, and therefore, the area of the peak derived from an oxygen bond becomes the same level as the catalyst washed with an acid.

The content of oxygen in the above catalyst was also estimated from the results of XPS. Each content of the T1 element, X1 element and X2 element having an oxygen bond in the catalyst was calculated from the peak derived from an oxygen bond of the main T1 element, main X1 element and main X2 element. The content of oxygen in the catalyst was estimated from the results of the calculation and the metal/oxygen composition ratio of an oxygen bond corresponding to each peak. Although the metal/oxygen composition ratio of an oxygen bond of the surface of the catalyst has been grasped only insufficiently, those shown in Tables 2 and 3 were used here.

The average particle diameter of the catalyst particles of each supported catalyst was measured as follows: a TEM was used to observe in five optional visual fields and each diameter of 20 particles was measured in each visual field to calculate an average of the diameters of a total of 100 particles as an average particle diameter. The obtained average particle diameter is shown in the following Tables 2 and 3.

Also, with regard to each of the catalysts containing the T1 element and obtained in Examples 1, 2, 5 to 11 and 16 to 21 and Comparative Examples 2 and 3, the peak magnification factor $P_1$ of the main T1 element were calculated from the equation (8) by using the aforementioned results of measurement. The peak magnification factor $P_2$ of the main X1 element or main X2 element were calculated from the equations (9) and (10) by using the aforementioned results of measurement, with regard to each of the catalysts containing the X1 element or X2 element and obtained in Examples 4, 14, 15 and 21. The results are described together in the above Table 1.

In the catalysts of Examples 1, 2, 5 to 10 and 16 to 21, as shown in Table 1, the peak magnification factor $P_1$ of the main T1 element in the XPS spectrum is 4 or less. In the catalyst of Examples 4, 14, 15 and 21, the peak magnification factor $P_2$ of the main X1 element or main X2 element in the XPS spectrum was 2 or less.

The supported catalysts obtained in Examples 22 to 56 and Comparative Examples 6 to 26 were used as anode catalysts. The electrode obtained in Example 57 was used as an anode as it was. As each counter cathode, a standard cathode (Pt catalyst supported by carbon black, commercially available product manufactured by Tanaka Kikinzoku Co., Ltd.) was used. A fuel cell electrode, a membrane electrode assembly and a signal cell were manufactured and evaluated in the following methods.

<Anode>

3 g of the obtained each catalyst was weighed. Each supported catalyst, 8 g of pure water, 15 g of 20% Nafion solution and 30 g of 2-ethoxyethanol were thoroughly stirred to disperse and then made into a slurry. The slurry was applied to carbon paper (manufactured by Toray Industries, Inc.; thickness: 350 μm) which had been subjected to water-repellent treatment, by a control coater and dried to produce an anode with a noble metal catalyst having a loading density of 1 mg/cm$^2$.

<Cathode>

First, 2 g of a Pt catalyst manufactured by Tanaka Kikinzoku Co., Ltd., was weighed. The Pt catalyst, 5 g of pure water, 5 g of a 20% Nafion solution and 20 g of 2-ethoxyethanol were thoroughly stirred to disperse and then, made into a slurry. The slurry was applied to carbon paper (manufactured by Toray Industries, Inc.; thickness: 350 μm) which had been subjected to water-repellent treatment, by a control coater and dried to produce a cathode with a noble metal catalyst having a loading density of 2 mg/cm$^2$.

<Production of Membrane Electrode Assembly>

The cathode and the anode were cut into a 3.2 by 3.2 cm square such that the electrode area of each electrode was 10 cm$^2$. A Nafion 117 (manufactured by Du Pont) was sandwiched as a proton conductive membrane between the cathode and the anode. And then these electrodes was applied to heat press at 125° C. under a pressure of 30 kg/cm$^2$ for 10 min., to manufacture a membrane electrode assembly.

The membrane electrode assembly and a channel plate were used to produce a single cell of a fuel direct supply type polymer electrolyte fuel cell. A 1 M methanol aqueous solution was supplied to the anode in the single cell at a rate of 0.6 mL/min., and at the same time, air was supplied to the cathode at a rate of 200 mL/min., to output at a current density of 150 mA/cm$^2$ while keeping the cell temperature at 65° C. Then, the voltage of the cell after 30 minutes was measured. The results are shown in the following Tables 2 and 3. As to the stability of the fuel cell, the single cell was made to generate power in the above operation condition for 500 hours to evaluate the rate of a reduction in voltage at a current density of 150 mA/cm$^2$ as a rate of deterioration. The results are shown in Tables 2 and 3.

TABLE 2

|  | Catalyst composition | Carrier temperature (° C.) | Peak magnification of main T1 element (times) | Peak magnifications of main X1 and X2 elements (times) | Oxygen content (atomic %) | Voltage (V) | Rate of deterioration (%) |
|---|---|---|---|---|---|---|---|
| Example 22 | $Pt_{50}Ru_{45}V_3Nb_2$ | 50 | 0.3 | Almost zero | 3 | 0.48 | 0.6 |
| Example 23 | $Pt_{64}Ru_{25}V_8Nb_3$ | 50 | 0.4 | 0.2 | 3 | 0.50 | 0.7 |
| Example 24 | $Pt_{30}Ru_{20}V_{30}Nb_{20}$ | 50 | 1.2 | 0.2 | 10 | 0.48 | 0.7 |
| Example 25 | $Pt_{50}Ru_{41}V_5Cr_4$ | 50 | 0.4 | 0.7 | 3 | 0.47 | 0.6 |
| Example 26 | $Pt_{60}Ru_{23}V_{10}Cr_7$ | 100 | 0.8 | 0.4 | 5 | 0.47 | 0.8 |
| Example 27 | $Pt_{50}Ru_{40}V_5Zr_5$ | 50 | 0.3 | 1.5 | 3 | 0.49 | 0.9 |
| Example 28 | $Pt_{30}Ru_{30}Ni_{30}V_6Nb_4$ | 50 | 0.4 | 0.3 | 5 | 0.48 | 0.7 |
| Example 29 | $Pt_{43}Ru_{30}Ni_{15}V_8Cr_4$ | 200 | 0.5 | 0.4 | 5 | 0.49 | 0.6 |
| Example 30 | $Pt_{50}Ru_{35}Sn_5V_6Nb_4$ | 50 | 0.6 | 0.5 | 5 | 0.50 | 0.6 |
| Example 31 | $Pt_{70}Ru_{15}Sn_2V_6Nb_5Zr_2$ | 50 | 0.4 | 0.6 | 5 | 0.51 | 0.7 |
| Example 32 | $Pt_{60}Ru_{25}Sn_2V_5Cr_5Ta_3$ | 50 | 0.4 | 0.4 | 5 | 0.53 | 0.8 |
| Example 33 | $Pt_{60}Ru_{25}Hf_4V_6Zr_5$ | 50 | 0.5 | 0.4 | 5 | 0.49 | 0.6 |
| Example 34 | $Pt_{50}Ru_{43}W_4Nb_3$ | 50 | 0.5 | 0.2 | 5 | 0.50 | 0.7 |
| Example 35 | $Pt_{50}Ru_{37}W_8Nb_5$ | 60 | 0.5 | 0.3 | 5 | 0.51 | 0.7 |
| Example 36 | $Pt_{40}Ru_{10}W_{30}Nb_{20}$ | 60 | 2.0 | 0.2 | 12 | 0.48 | 0.6 |
| Example 37 | $Pt_{50}Ru_{38}W_6Cr_6$ | 60 | 0.8 | 0.4 | 5 | 0.48 | 0.8 |
| Example 38 | $Pt_{20}Ru_{30}W_{30}Cr_{20}$ | 60 | 1.6 | 0.4 | 9 | 0.49 | 0.9 |
| Example 39 | $Pt_{60}Ru_{20}W_{10}Cr_{10}$ | 60 | 0.7 | 0.5 | 5 | 0.50 | 0.7 |
| Example 40 | $Pt_{40}Ru_{50}W_5Zr_5$ | 60 | 0.8 | 0.7 | 6 | 0.51 | 0.6 |
| Example 41 | $Pt_{55}Ru_{35}W_5Ti_5$ | 60 | 0.5 | 0.6 | 6 | 0.53 | 0.6 |
| Example 42 | $Pt_{50}Ru_{30}W_{10}Mo_5Nb_5$ | 60 | 0.5 | 1.2 | 5 | 0.49 | 0.7 |
| Example 43 | $Pt_{40}Ru_{31}Ni_{20}W_6Nb_3$ | 80 | 0.5 | 0.1 | 5 | 0.49 | 0.8 |
| Example 44 | $Pt_{40}Ru_{22}Ni_{30}W_5Cr_3$ | 80 | 0.6 | 0.4 | 3 | 0.49 | 0.7 |
| Example 45 | $Pt_{56}Ru_{25}Sn_4W_5Cr_6Ta_4$ | 80 | 0.75 | 0.5 | 8 | 0.48 | 0.8 |
| Example 46 | $Pt_{50}Ru_{35}Sn_{0.5}W_8Nb_{6.5}$ | 80 | 0.5 | 0.2 | 7 | 0.49 | 0.9 |

TABLE 3

| | Catalyst composition | Carrier temperature (° C.) | Peak magnification of main T1 element (times) | Peak magnifications of main X1 and X2 elements (times) | Oxygen content (atomic %) | Voltage (V) | Rate of deterioration (%) |
|---|---|---|---|---|---|---|---|
| Example 47 | $Pt_{50}Ru_{35}Hf_5W_6Ti_4$ | 80 | 0.6 | 0.4 | 5 | 0.50 | 0.7 |
| Example 48 | $Pt_{50}Ru_{25}Ir_{10}Rh_5Sn_1W_4Cr_5$ | 80 | 0.6 | 0.5 | 5 | 0.51 | 0.8 |
| Example 49 | $Pt_{45}Ru_{25}Os_{10}Sn_1W_{15}Zr_4$ | 80 | 0.7 | 0.5 | 5 | 0.49 | 0.8 |
| Example 50 | $Pt_{50}Ru_{37}Mo_{10}Nb_3$ | 80 | 0.6 | 0.3 | 5 | 0.48 | 0.9 |
| Example 51 | $Pt_{50}Ru_{34}Mo_1Cr_{15}$ | 50 | 0.7 | 0.4 | 10 | 0.47 | 0.7 |
| Example 52 | $Pt_{50}Ru_{35}Mo_{10}Zr_5$ | 50 | 0.6 | 0.4 | 3 | 0.49 | 0.7 |
| Example 53 | $Pt_{60}Ru_{30}Mo_7Ti_3$ | 50 | 0.8 | 0.5 | 5 | 0.48 | 0.8 |
| Example 54 | $Pt_{40}Ru_{30}Ni_{21.5}Mo_8Nb_{0.5}$ | 50 | 0.8 | 0.3 | 4 | 0.47 | 0.9 |
| Example 55 | $Pt_{50}Ru_{35}Sn_3Mo_8Cr_4$ | 50 | 0.7 | 0.4 | 5 | 0.48 | 0.8 |
| Example 56 | $Pt_{50}Ru_{20}Hf_{20}Mo_5Ti_5$ | 50 | 0.7 | 0.5 | 4 | 0.47 | 0.9 |
| Example 57 | $Pt_{50}Ru_{30}Hf_{10}Mo_6Ti_4$ | 50 | 0.6 | 0.5 | 4 | 0.48 | 0.8 |
| Comparative Example 6 | $Pt_{50}Ru_{50}$ | 50 | — | — | Almost zero | 0.42 | 0.5 |
| Comparative Example 7 | $Pt_{50}Ru_{48}V_2$ | 50 | 0.8 | — | 2 | 0.50 | 2 |
| Comparative Example 8 | $Pt_{50}Ru_{45}W_5$ | 50 | 0.6 | — | 3 | 0.48 | 2 |
| Comparative Example 9 | $Pt_{50}Ru_{48}Mo_2$ | 50 | 0.6 | — | 3 | 0.45 | 2 |
| Comparative Example 10 | $Pt_{50}Ru_{48}Nb_2$ | 50 | — | 0.5 | 4 | 0.47 | 1.5 |
| Comparative Example 11 | $Pt_{50}Ru_{40}Zr_{10}$ | 50 | — | 0.6 | 6 | 0.30 | — |
| Comparative Example 12 | $Pt_{50}Ru_{40}Cr_{10}$ | 50 | — | 0.6 | 5 | 0.35 | — |
| Comparative Example 13 | $Pt_{50}Ru_{40}Ti_{10}$ | 50 | — | 0.6 | 5 | 0.30 | — |
| Comparative Example 14 | $Pt_{50}Ru_{45}V_{0.5}Nb_{4.5}$ | 50 | — | — | 2 | 0.45 | 0.6 |
| Comparative Example 15 | $Pt_{35}Ru_{25}V_{35}Nb_5$ | 50 | — | — | 3 | 0.43 | 2 |
| Comparative Example 16 | $Pt_{50}Ru_{45}V_{4.7}Nb_{0.3}$ | 50 | — | — | 4 | 0.45 | 4 |
| Comparative Example 17 | $Pt_{40}Ru_{25}V_5Nb_{30}$ | 50 | — | — | 3 | 0.30 | 5 |
| Comparative Example 18 | $Pt_{50}Ru_{45}W_{0.5}Nb_{4.5}$ | 50 | — | — | 3 | 0.44 | 0.8 |
| Comparative Example 19 | $Pt_{35}Ru_{25}W_{35}Nb_5$ | 50 | — | — | 3 | 0.42 | 1.0 |
| Comparative Example 20 | $Pt_{50}Ru_{45}W_{4.7}Nb_{0.3}$ | 50 | — | — | 3 | 0.40 | 2.0 |
| Comparative Example 21 | $Pt_{40}Ru_{25}W_5Nb_{30}$ | 50 | — | — | 15 | 0.30 | 0.8 |
| Comparative Example 22 | $Pt_{50}Ru_{45}W_{0.5}Cr_{4.5}$ | 50 | — | — | 3 | 0.44 | 0.8 |
| Comparative Example 23 | $Pt_{35}Ru_{25}W_{35}Cr_5$ | 50 | — | — | 3 | 0.42 | 2 |
| Comparative Example 24 | $Pt_{50}Ru_{45}W_{4.7}Cr_{0.3}$ | 50 | — | — | 3 | 0.40 | 4 |
| Comparative Example 25 | $Pt_{40}Ru_{25}W_5Cr_{30}$ | 50 | — | — | 3 | 0.40 | 5 |
| Comparative Example 26 | $Pt_{70}Ru_{20}V_8Nb_2$ solution reaction method | — | 100 | 100 | — | 0.35 | 0.8 |

TABLE 4

| Element | Range of peak derived from metal bond (ev) | Range of peak derived from oxygen bond and element/oxygen composition ratio |
|---|---|---|
| V | 512-513 (2p3/2) | $V_2O_3$: 516-517 (2p3/2) |
| W | 31 ev-34 ev (4f7/2) | $WO_3$: 36-40 (4f5/2) |
| Mo | 227-228 (3d5/2) | MoO: 235-237 (3d5/2) |
| Nb | 202-203 (3d5/2) | NbO: 203-205 (3d3/2) |
| | | $Nb_2O_5$: 209-211 (3d5/2) |
| Cr | 574 (2p3/2) | $Cr_2O_3$: 576-580 (2p3/2) |
| Zr | 178-179 (3d5/2) | $ZrO_2$: 184-185 (3d3/2) |
| Ti | 454 (2p3/2) | TiO: 455 (2p3/2), $TiO_2$: 459 |
| Ta | 23-24 (4f7/2) | $Ta_2O_5$: 27-29 (4f5/2) |
| Si | 99-100 (2p) | $SiO_2$: 103-104 (2p) |
| Al | 117-118 (2s) | $Al_2O_3$: 120-121 (2s) |
| Sn | 493-494 (3d3/2) | $SnO_2$: 494-496 (3d3/2) |
| Hf | 14-15 (4f7/2) | $HfO_2$: 17-19 (4f5/2) |

As shown in the results of Tables 2 and 3, it is found that when Examples 22 to 57 are respectively compared with Comparative Example 6, the catalysts of Examples 22 to 57 each have higher activity than and stability at the same level as the PtRu catalyst of Comparative Example 6. As to the elemental combination of Pt—Ru—V—Nb, a comparison of Examples 22 to 24 with Comparative Examples 7 and 10 brings about an understanding of the fact that the catalysts to which a combination of the V element and the Nb element was added have high stability as shown by a deterioration rate of 1% or less while maintaining high activity. A comparison of Examples 22 to 24 with Comparative Examples 14 to 17 reveals that if the amount of the T1 element to be added is out of the range from 1 to 30 at. % or the amount of the X1 element to be added is out of the range from 0.5 to 20 at. %, the high activity and the high stability as shown by a deterioration rate of 1% or less cannot be accomplished at the same time.

Also, a comparison of Examples 22 to 24 with Comparative Example 26 reveals that it is necessary to control the binding condition of the elements besides the composition to obtain high activity. The same results as in the case of the catalyst having an elemental combination of Pt—Ru—V—Nb are obtained by catalysts having elemental combinations of Pt—Ru—W—Nb, Pt—Ru—W—Cr and the like.

The same tendency as above was also confirmed in the case of a reformed gas type polymer electrolyte type fuel cell using the catalyst of Examples. Therefore, the catalyst according to the embodiment is also more effective than a known Pt—Ru catalyst to prevent CO poisoning.

As explained above, this embodiment can provide a catalyst having high activity and high stability and a fuel cell which can attain a high output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A catalyst having a composition represented by the following formula (3), satisfying the following equations (4) and (5) in X-ray photoelectron spectrometry (XPS), and having a peak derived from a metal bond of a T1 element which is shown in an XPS spectrum:

$$Pt_xRu_yT1_aX1_b \quad (3)$$

wherein the T1 element is at least one element selected from the group consisting of V, W and Mo, an X1 element is at least one element selected from the group consisting of Nb, Cr, Zr and Ti, x is 20 to 70 at. %, y is 10 to 50 at. %, a is 1 to 30 at. % and b is 0.5 to 20 at. %;

$$0 \leq (C_{oxygenT1}/C_{metalT1}) \leq 4 \quad (4)$$

$$0 \leq (C_{metalX1}/C_{oxygenX1}) \leq 2 \quad (5)$$

wherein $C_{oxygenT1}$ is an amount of the Ti element having an oxygen bond which is obtained by the XPS spectrum, $C_{metalT1}$ is an amount of the T1 element having a metal bond which is obtained by the XPS spectrum, $C_{metalX1}$ is an amount of the X1 element having a metal bond which is obtained by the XPS spectrum, and $C_{oxygenX1}$ is an amount of the X1 element having an oxygen bond which is obtained by the XPS spectrum.

2. The catalyst according to claim 1, comprising oxygen atoms bound with the X1 element.

3. A method of manufacturing the catalyst according to claim 1, the method comprising forming the catalyst on a conductive carrier which is kept at 400° C. or less, by a sputtering method or a deposition method.

4. An membrane electrode assembly comprising:
a cathode;
an anode comprising the catalyst according to claim 1; and
a proton conductive membrane provided between the cathode and the anode.

5. The catalyst of claim 1, wherein $0 \leq (C_{oxygenT1}/C_{metalT1}) \leq 2$.

6. The catalyst of claim 1, wherein $0 \leq (C_{metalX1}/C_{oxygenX1}) \leq 1$.

7. The catalyst of claim 1, wherein $0 \leq (C_{oxygenT1}/C_{metalT1}) \leq 2$, and wherein $0 \leq (C_{metalX1}/C_{oxygenX1}) \leq 1$.

8. The catalyst of claim 1, wherein a is 2 to 20 at. %.

9. The catalyst of claim 1, wherein b is 1 to 15 at. %.

10. The catalyst of claim 1, wherein a is 2 to 20 at. %, and wherein b is 1 to 15 at. %.

11. The catalyst of claim 1, wherein the catalyst is in the form of nano-particles, and wherein the nano-particles have an average particle diameter of 10 nm or less.

12. The catalyst of claim 1, wherein the catalyst is in the form of nano-particles, and wherein the nano-particles have an average particle diameter of from 0.5 to 10 nm.

13. The catalyst of claim 1, wherein $0 \leq (C_{oxygenT1}/C_{metalT1}) \leq 2$, wherein $0 \leq (C_{metalX1}/C_{oxygenX1}) \leq 1$, wherein a is 2 to 20 at. %, and wherein b is 1 to 15 at. %.

14. A catalyst having a composition represented by the following formula (6), satisfying the following equations (4) and (7) in X-ray photoelectron spectrometry (XPS), and having a peak derived from a metal bond of a T1 element which is shown in an XPS spectrum:

$$Pt_xRu_yT1_aX2_cA1_d \quad (6)$$

wherein the TI element is at least one element selected from the group consisting of V, W and Mo, an X2 element is at least one element selected from the group consisting of Nb, Cr, Zr, Ta and Ti, an A1 element is at least one element selected from the group consisting of Sn, Hf, Ni, Rh, Os and Ir, x is 20 to 70 at. %, y is 10 to 50 at. %, a is 1 to 30 at. %, c is 0.5 to 20 at. %, and d is 0.5 to 30 at. %;

$$0 \leq (C_{oxygenT1}/C_{metalT1}) \leq 4 \quad (4)$$

$$0 \leq (C_{metalX2}/C_{oxygenX2}) \leq 2 \quad (7)$$

wherein $C_{oxygenT1}$ is an amount of the T1 element having an oxygen bond which is obtained by the XPS spectrum, $C_{metalT1}$ is an amount of the T1 element having a metal bond which is obtained by the XPS spectrum, $C_{metalX2}$ is an amount of the X2 element having a metal bond which is obtained by the XPS spectrum, and $C_{oxygenX2}$ is an amount of the X2 element having an oxygen bond which is obtained by the XPS spectrum.

15. The catalyst according to claim 14, comprising oxygen atoms bound with the X2 element.

16. An membrane electrode assembly comprising:
a cathode;
an anode comprising the catalyst according to claim 14; and
a proton conductive membrane provided between the cathode and the anode.

17. The catalyst of claim 14, wherein $0 \leq (C_{metalX2}/C_{oxygenX2}) \leq 1$.

18. The catalyst of claim 14, wherein the catalyst is in the form of nano-particles, and wherein the nano-particles have an average particle diameter of 10 nm or less.

19. The catalyst of claim 14, wherein the catalyst is in the form of nano-particles, and wherein the nano-particles have an average particle diameter of from 0.5 to 10 nm.

* * * * *